US008261269B2

United States Patent
Garmark

(10) Patent No.: US 8,261,269 B2
(45) Date of Patent: Sep. 4, 2012

(54) SYSTEM AND METHOD FOR SYNCHRONIZING TRANSIENT RESOURCE USAGE BETWEEN VIRTUAL MACHINES IN A HYPERVISOR ENVIRONMENT

(75) Inventor: Sten Garmark, Stockholm (SE)

(73) Assignee: Oracle International Corporation, Redwood Shores, CA (US)

( * ) Notice: Subject to any disclaimer, the term of this patent is extended or adjusted under 35 U.S.C. 154(b) by 310 days.

(21) Appl. No.: 12/563,440

(22) Filed: Sep. 21, 2009

(65) Prior Publication Data

US 2011/0072427 A1    Mar. 24, 2011

(51) Int. Cl.
G06F 9/455    (2006.01)
(52) U.S. Cl. .......................................................... 718/1
(58) Field of Classification Search .................. None
See application file for complete search history.

(56) References Cited

U.S. PATENT DOCUMENTS

| 7,299,468 | B2 * | 11/2007 | Casey et al. ................. 718/104 |
| 7,574,496 | B2 * | 8/2009 | McCrory et al. ............. 709/223 |
| 2004/0230949 | A1 * | 11/2004 | Talwar et al. ................ 717/118 |
| 2008/0034365 | A1 * | 2/2008 | Dahlstedt .................... 718/1 |
| 2008/0307183 | A1 | 12/2008 | Deval |
| 2009/0070776 | A1 * | 3/2009 | Dahlstedt .................... 719/312 |
| 2009/0178037 | A1 * | 7/2009 | Winter et al. ................ 718/1 |

OTHER PUBLICATIONS

PCT International Search Report in connection with PCT Application No. PCT/US2010/047163 dated Dec. 2, 2010, 8 pages.
Shuf, "Exploiting Prolific Types of Memory Management and Optimizations", ACM, vol. 37, No. 1, Jan. 2002, 12 pages.

* cited by examiner

Primary Examiner — Emerson Puente
Assistant Examiner — Gregory Kessler
(74) Attorney, Agent, or Firm — Fliesler Meyer LLP

(57) ABSTRACT

A system and method for synchronizing transient resource usage between virtual machines, e.g. Java Virtual Machines (JVMs), running within a hypervisor. In accordance with an embodiment, the system allows for synchronizing garbage collection and code optimization to reduce transient processor (cpu) and memory usage. In accordance with an embodiment, the system comprises a computer; a hypervisor for executing virtual servers running JVMs; a communication channel between the virtual servers; wherein each virtual server further comprises non-transient and transient memory and a synchronization module. In accordance with an embodiment the synchronization modules schedule garbage collects and code optimizations to minimize overlaps, thereby reducing the peak transient memory and cpu usage and the resulting volatility of transient resource usage within a computer. In accordance with another embodiment, a cloud manager can move virtual servers between computers to optimize computer volatility within a cloud.

20 Claims, 9 Drawing Sheets

SYSTEM AND METHOD FOR SYNCHRONIZING TRANSIENT RESOURCE USAGE BETWEEN VIRTUAL MACHINES IN A HYPERVISOR ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to application servers and virtual machines, and particularly to a system and method for synchronizing transient resource usage between virtual machines (for example JVMs) running within a hypervisor.

BACKGROUND

Server virtualization using hypervisors is a valuable technique to reduce the operating costs of the server, as well as improving the energy efficiency. A standard server with a standard operating system and different server applications is rarely fully used all the time. Since current server hardware does not significantly reduce the energy consumption when the software is idling, this will result in energy waste. Server virtualization allows many virtual servers to run on a single physical server, and therefore the processor (cpu) cycles and memory that were previously wasted can instead be put to use for another virtual server. The software that makes this possible is referred to herein as a hypervisor.

When operating systems and server applications are virtualized onto physical hardware, a safety margin must be provided to handle those situations when there is a sudden surge in cpu cycles usage and/or memory usage by the server applications. Depending on how volatile the server applications resource usage is, this margin can be small or large. If the overall volatility of all virtual servers running within a hypervisor is low, then the margins can be kept small, and this will generally provide higher savings since more virtual servers can reliably be run on the same physical hardware.

Many server applications are currently written in the high-level language Java. Such applications are run with Java Virtual Machines (JVMs). Unfortunately the cpu-cycles and memory usage for a JVM can be quite volatile, and independent of the server application itself. This is due to the fact that a JVM has to garbage collect the Java heap, as well as optimize code that has been detected as hot. These resource usages are transient and can be significant.

Because of this, virtualized Java applications need larger safety margins than other server applications, which means that virtualization savings for virtualized Java server applications are less than for other kinds of server applications. This is an area that embodiments of the present invention are intended to address.

SUMMARY

Disclosed herein is a system and method for synchronizing transient resource usage between virtual machines, e.g. Java Virtual Machines (JVMs), running within a hypervisor. In accordance with an embodiment, the system allows for synchronizing garbage collection and code optimization to reduce transient processor (cpu) and memory usage. In accordance with an embodiment, the system comprises a computer; a hypervisor for executing virtual servers each running a JVM; a communication channel between the virtual servers; wherein each virtual server further comprises non-transient and transient memory and a synchronization module. In accordance with an embodiment the synchronization modules schedule garbage collects and code optimizations to minimize overlaps, thereby reducing the peak transient memory and cpu usage and the resulting volatility of transient resource usage within a computer. In accordance with another embodiment, a cloud manager can move virtual servers between computers to optimize computer volatility within a cloud.

DETAILED DESCRIPTION

Described herein is a system and method for synchronizing transient resource usage between virtual machines, e.g. JVMs running within a hypervisor. As described herein, it is desirable to lower the resource usage volatility of each virtual server to allow more virtual servers to be safely run within the same hypervisor. Unfortunately JVMs have a rather high volatility with garbage collects and code optimizations that can consume significant memory and processor (cpu) resources.

In accordance with an embodiment, a system and method is provided that enables transient resource usage to be synchronized by advancing or postponing the execution of processes in the different JVMs thereby avoiding peaks in transient resource usage; thus lowering the volatility and allowing more virtual servers to be run within a single hypervisor with the same safety margins. This is possible since garbage collection and code optimization are processes where the former can be advanced, and the latter postponed, without significantly affecting performance of the running system.

It is not always possible to avoid overlapping processes. The number of overlapping transient processes over a fixed period of time is an indication of the overall volatility of the computer. In accordance with an embodiment, this number can be used to evaluate if a computer has good safety margins. In accordance with another embodiment, virtual servers can be moved between computers within a cloud to reduce volatility of servers with high volatility, and increase volatility of servers with inefficiently low volatility. In accordance with another embodiment, a tailored operating system that can only run a single JVM can reduce the volatility of a virtual server, since there are no other possible processes competing for resources.

Figure 1:
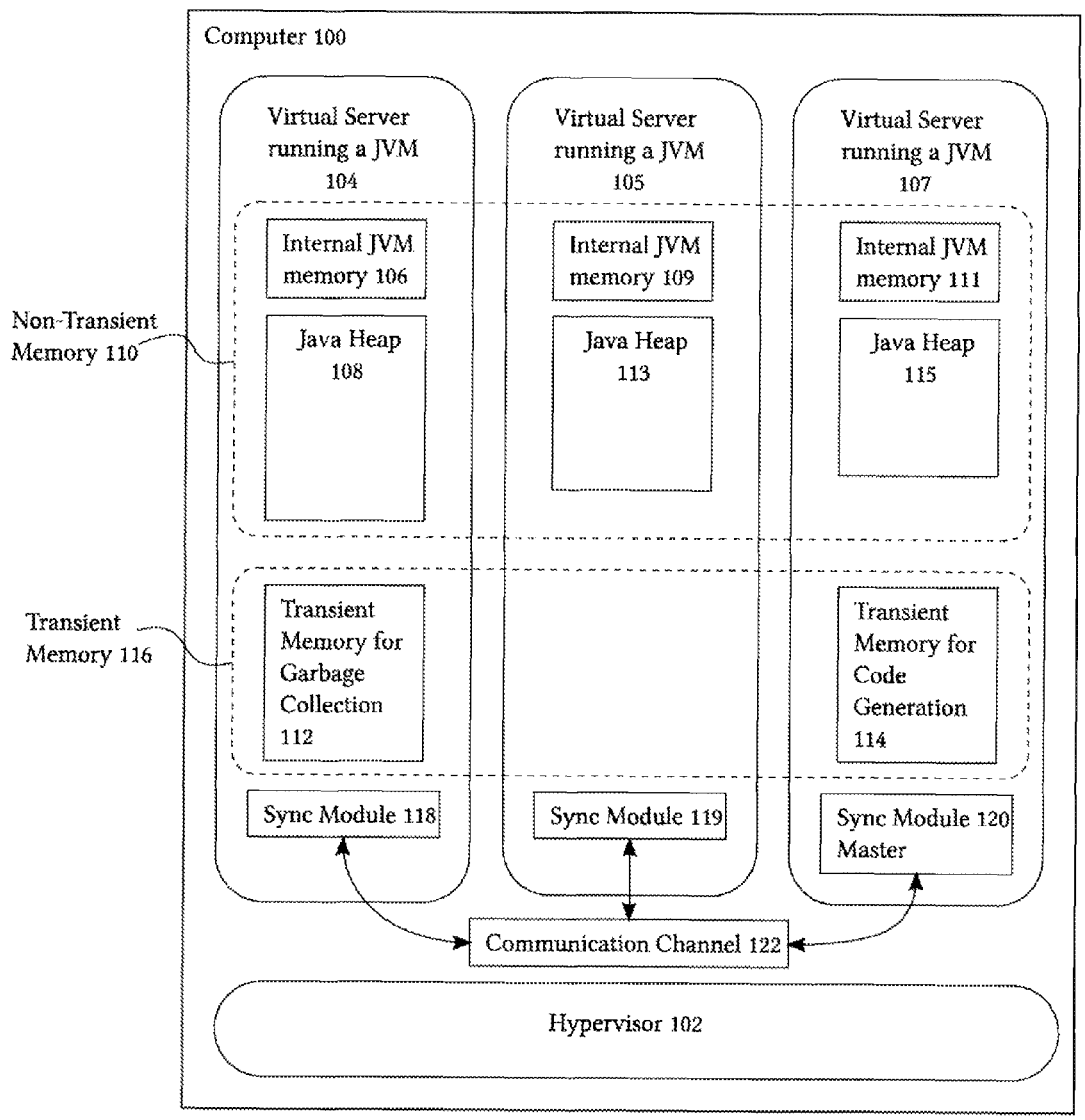
FIG. 1 shows an illustration of a system for synchronizing transient resource usage in accordance with an embodiment.

FIG. 1 shows an illustration of a system in accordance with an embodiment. As shown in FIG. 1, an embodiment of the system generally comprises a computer 100 with a hypervisor 102 on which a plurality of virtual servers 104, 105, 107 are running.

Each virtual server runs a JVM that needs internal memory 106, 109, 111 to function. Each virtual server further includes a Java heap 108, 113, 115, which is required to execute the application server code. The internal memory and the heap are both considered non-transient memory 110, that changes size slowly, if at all.

A short-lived process, such as garbage collection, requires memory 112 to execute. Other examples of short lived processes are code optimizations, and the memory 114 needed for it to execute. The memory needed for these short lived processes is considered transient memory 116.

Each virtual server contains a synchronization module 118, 119, 120. One of these synchronization modules is selected at random to be the master synchronization module 120. The master synchronization module uses a communication channel 122 to synchronize the transient resource usage of all of the virtual servers running within the hypervisor. This can be used to, for example, prevent garbage collection and code generation in different virtual servers from running concurrently, and thereby reducing the peak usage of transient memory and cpu cycles.

Figure 2:
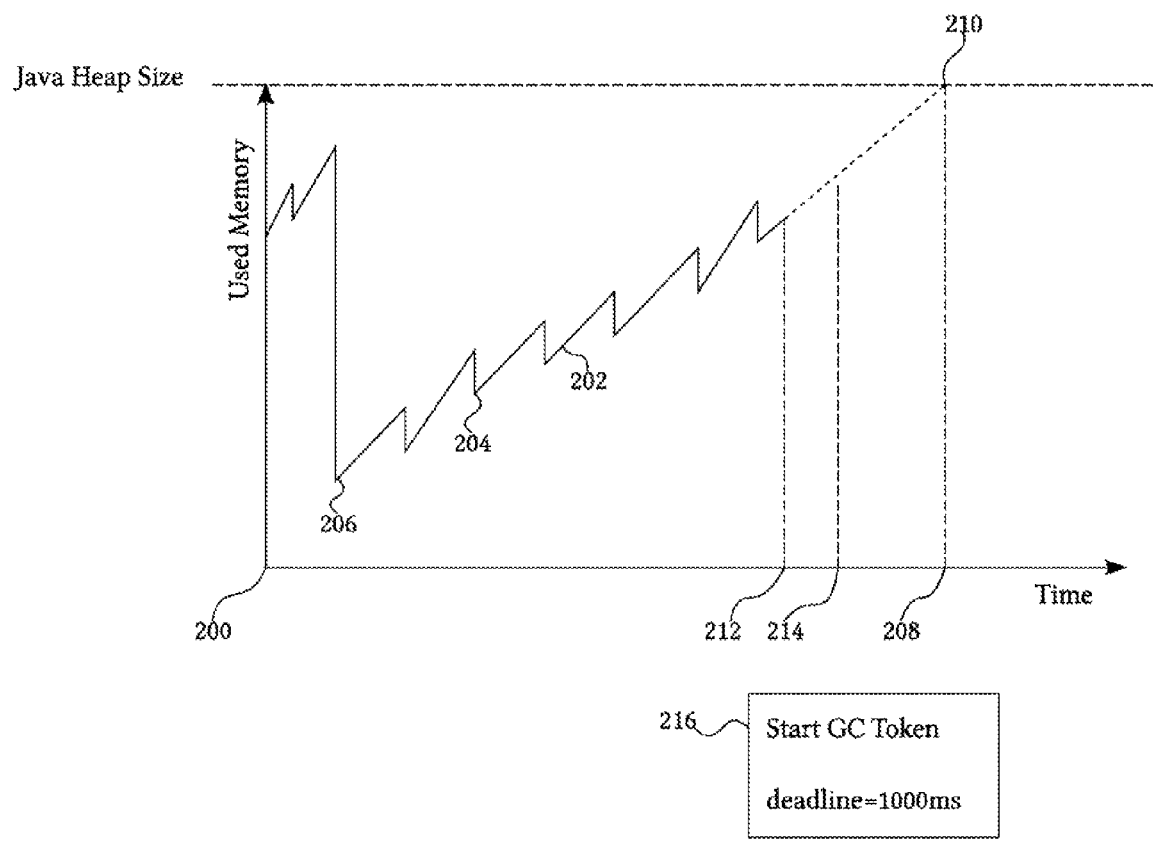
FIG. 2 shows a graph illustrating how a garbage collection can be advanced, in accordance with an embodiment.

FIG. 2 shows a graph illustrating how a garbage collection can be advanced, in accordance with an embodiment. As shown in FIG. 2, the diagram 200 illustrates an example of how the used memory 202 of the Java heap increases over time.

Each small drop 204 in the used memory is the result of a nursery garbage collection that is very fast and requires little cpu and memory usage.

The large drop in used memory 206 is the result of an whole heap garbage collection that can require a significant amount of cpu and memory usage. The whole heap garbage collection will be forced when all the Java heap is used up at the time 208. In accordance with an embodiment, this time can be predicted with a linear approximation of the slope of the Java heap usage graph and extending this line until it meets the Java heap size 210. The end time of a garbage collect can be predicted to be start time plus the length of the previous garbage collect in the same JVM.

A garbage collect can be initiated at anytime before 208, i.e. it is advanced ahead of its natural time of execution, which is when the Java heap is full. At time 212 the master synchronization module needs to advance the predicted garbage collect from the time 208 to the time 214. In accordance with an embodiment it does so by sending a Start GC token 216 using the communication channel 122, together with a suitable deadline to make sure the GC happens before time 214.

Figure 3:
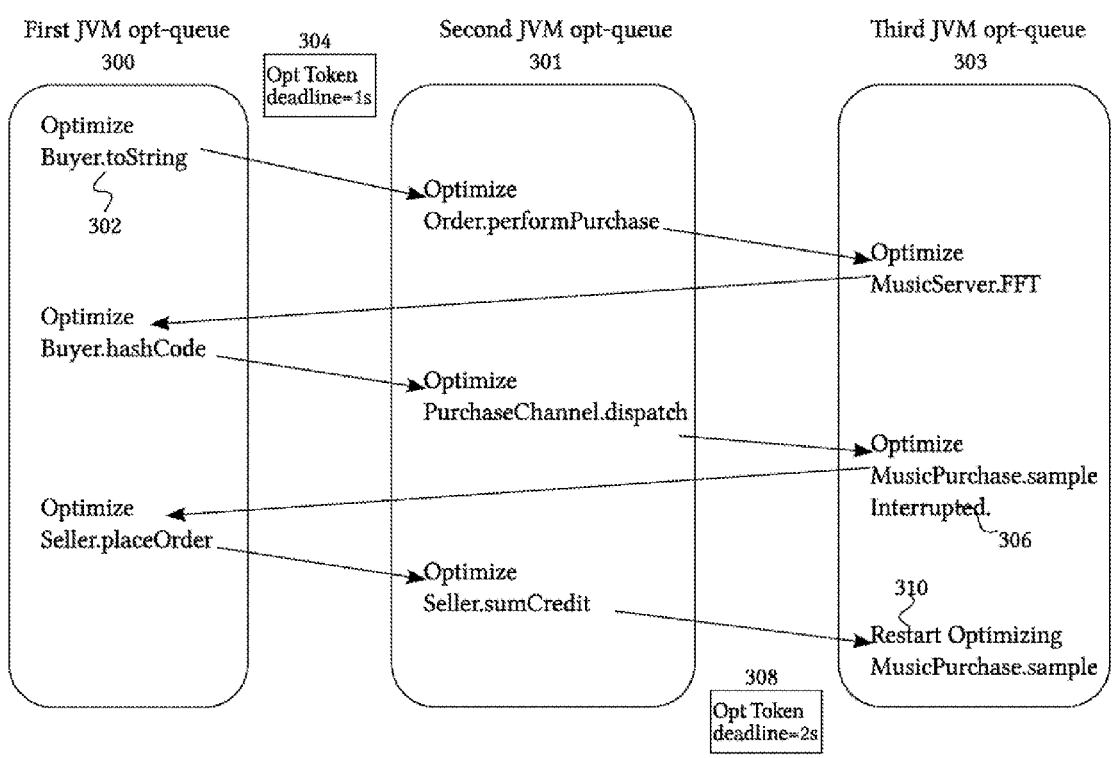
FIG. 3 shows an illustration of how concurrent code optimization in separate JVMs can be prevented using a round robin scheme, in accordance with an embodiment.

FIG. 3 shows an illustration how concurrent code optimization in separate JVMs can be prevented using a round robin scheme controlled by the master synchronization module, in accordance with an embodiment. As shown in FIG. 3, three optimization queues 300, 301, 303 are provided, one for each of the plurality of JVMs, wherein each queue contains a list of methods that need to be optimized for that JVM. Optimized code is usually not shared between different JVMs since optimizations sometimes depend on runtime behavior that can differ between the JVMs. Another reason for not sharing the optimized code between different JVMs is that the optimized code also encodes several runtime references to fixed addresses only valid within that particular JVM. If optimized code was to be moved between different JVMs these references would have to be relinked. As shown in this example, after the first JVM has optimized the method Buyer.toString 302, the synchronization module transfers an optimization token 304 to the second JVM. The optimization token gives the JVM the right to optimize a method for, at most, a certain time specified by the optimization token, in this instance 1s. Once the method is optimized, an optimization token can be provided to another JVM, and the process continues in a striping fashion across the plurality of JVMs.

Effectively every optimization at a JVM is postponed until the JVM has received an optimization token. If the JVM has failed to complete the optimization within the allotted time it must abort the optimization, as illustrated in this instance by the aborted optimization 306, and later restart the optimization when the JVM is later given a new optimization token. The failure is reported to the synchronization module which can send a modified optimization token 308 to the JVM that doubles the length of the original time slot, in this instance to 2s. Thus the optimization of MusicPurchase.sample can be subsequently restarted 310 and have a higher likelihood of completion.

Figure 4:
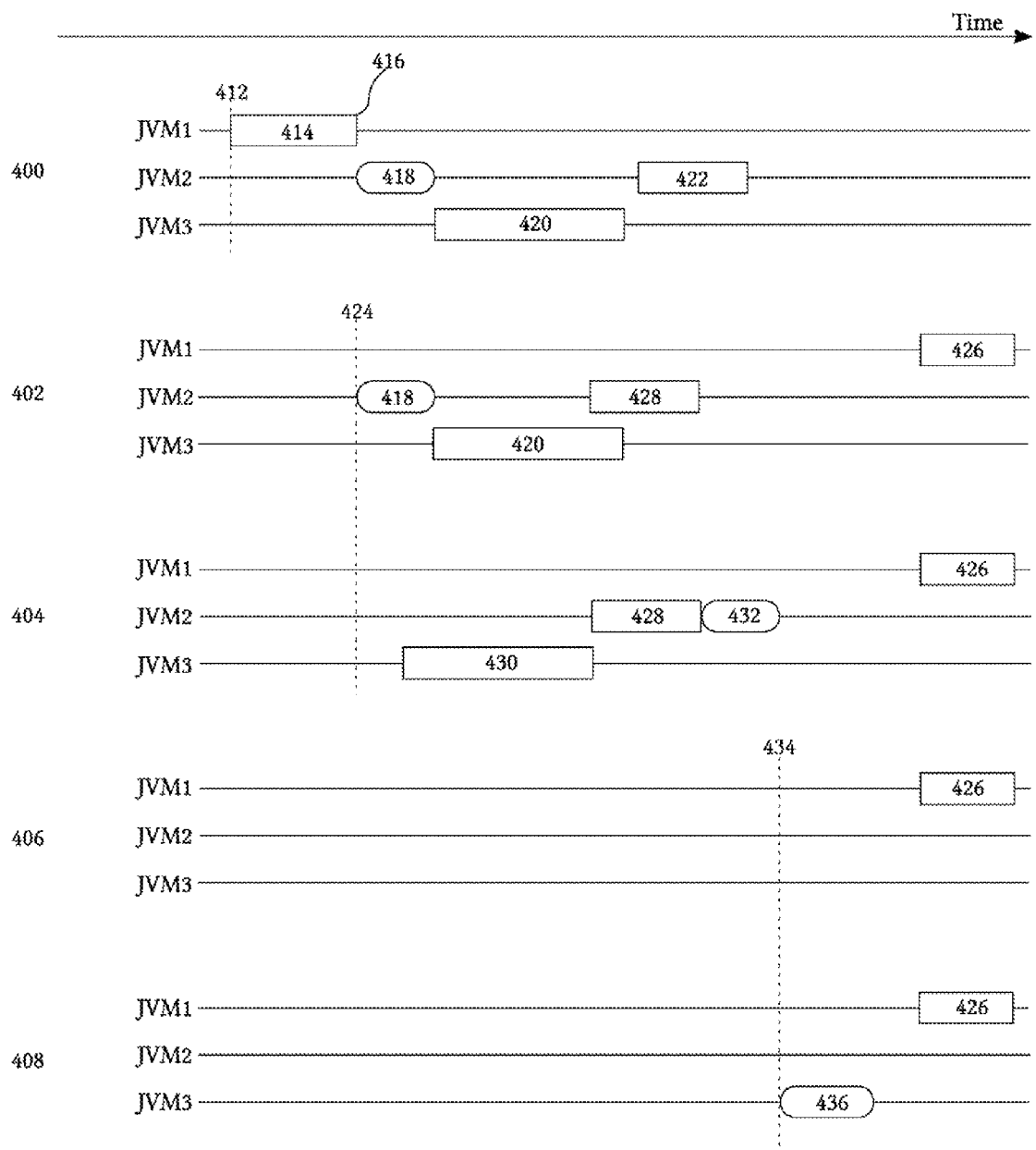
FIG. 4 shows an illustrating of how the synchronization is achieved between three JVMs by advancing garbage collects and postponing code optimizations, in accordance with an embodiment.

FIG. 4 shows an illustration of how the synchronization is achieved between three JVMs by advancing garbage collects and postponing code optimizations, in accordance with an embodiment. As shown in FIG. 4, a schedule for garbage collects and code optimizations evolves successively from different instances of the schedule 400, 402, 404, 406 to 408. Garbage collects are visualized as rectangles, and code optimizations are visualized as ellipses.

In the example shown, in a first instance of the schedule 400, at a time 412, the master synchronization module has received a predicted garbage collect 414 from JVM1 starting at time 412 and ending at time 416. It has also scheduled a code optimization 418. JVM 3 has predicted a garbage collect 420; and JVM 2 has predicted a collect 422.

At time 424, the master synchronization module requests new predictions from the JVMs and updates the schedule from its original instance 400 to a modified instance 402. In this example, the schedule is updated with the new predicted garbage collect 426 for JVM 1. The master synchronization module also detects that the predicted start time for garbage collect 422 has moved to 428 and therefore overlaps with the currently predicted garbage collect 420.

To resolve this, the master synchronization module updates the schedule 404, and advances the garbage collect 420 to a new time 430, which is enough to avoid overlap. It does so by sending a suitable start GC token to JVM 3. Unfortunately the scheduled optimization 418 has to be postponed since it cannot be started as previous optimization statistics show that it would not complete within the shortened time frame. It is therefore moved to a time 432.

At time 434, the master synchronization module again acquires the latest predictions from the JVMs and can therefore update the schedule 406, 408, and schedule a new optimization 436.

Figure 5:
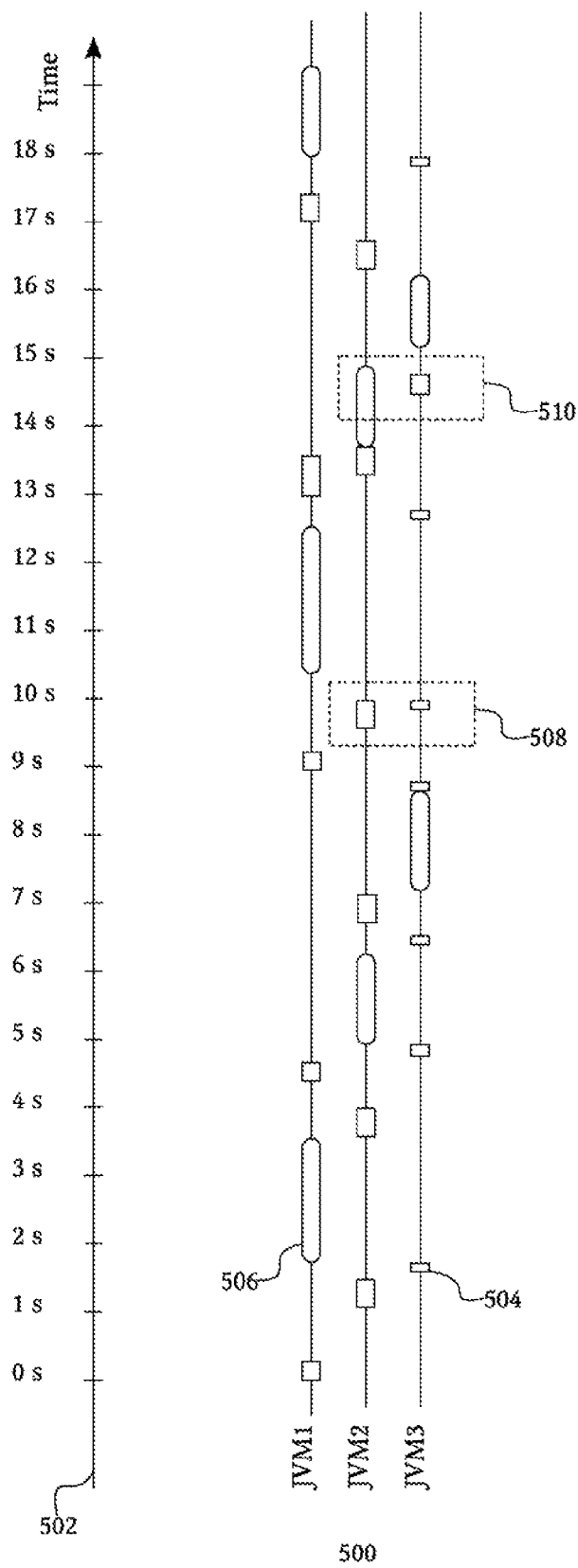
FIG. 5 shows an illustration of achieved synchronization and low volatility in a different scale, in accordance with an embodiment.

FIG. 5 shows an illustration of achieved synchronization and low volatility in a different scale, in accordance with an embodiment. As shown in FIG. 5, the schedule 500 illustrates the actual garbage collections and code optimizations in a scale 502 that reflects the real world values (in this example 20 seconds). A garbage collect is again visualized as a rectangle 504 and a code optimization is visualized as an ellipse 506. In the example shown, most of the garbage collects and the code optimizations are non-overlapping, except for 508 where two garbage collects are scheduled to happen at the same time, and 510 where one garbage collect and one code optimization happen at the same time. It is worth noting that no two code optimizations are scheduled to happen at the same time. The number of overlaps are therefore 2, which is the volatility of the computer for a period of 20 seconds.

Figure 6:
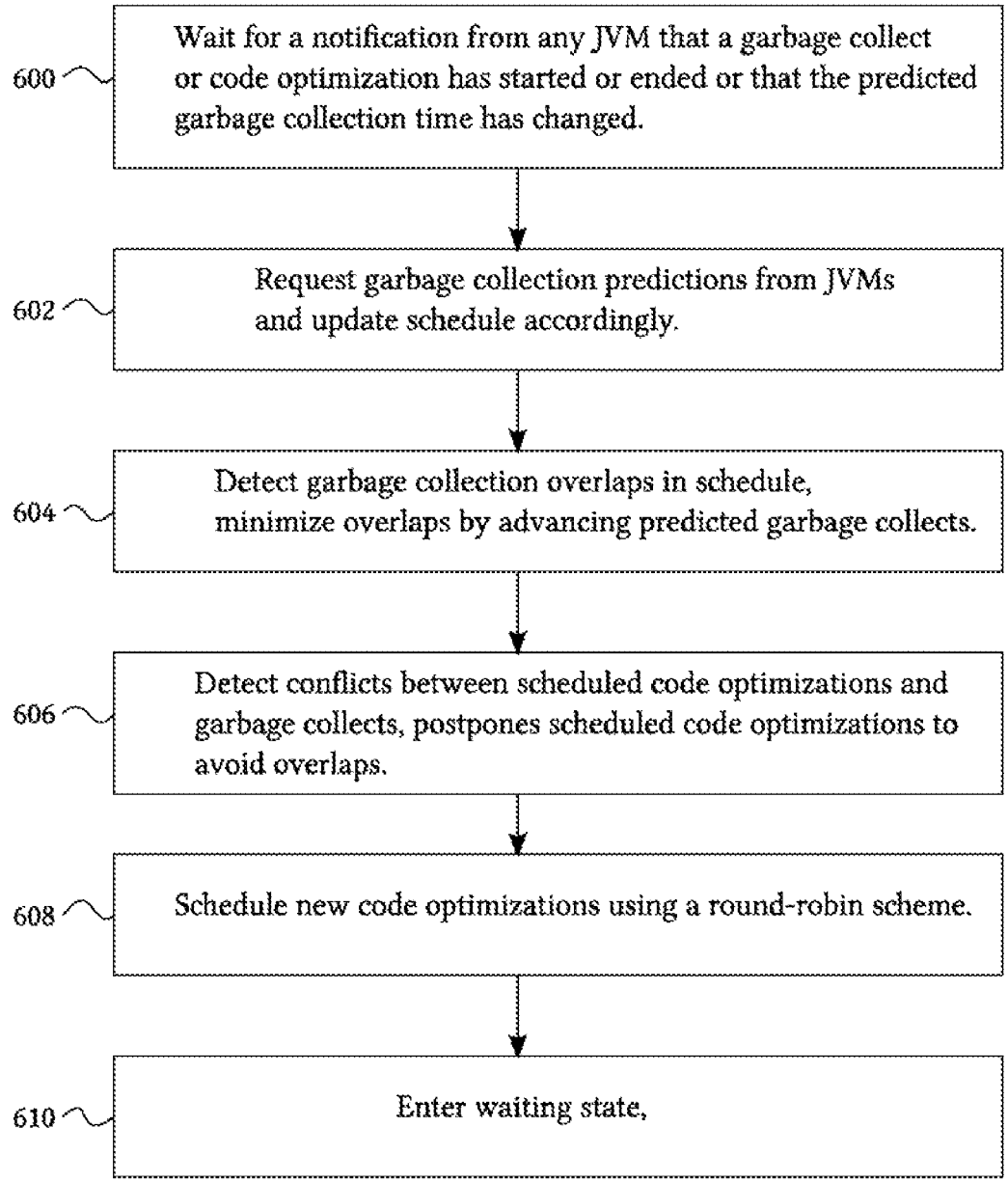
FIG. 6 shows a flowchart of a method to synchronize the transient resource usage, in accordance with an embodiment.

FIG. 6 shows a flowchart of a method to synchronize the transient resource usage, in accordance with an embodiment. As shown in FIG. 6, in step 600 the master synchronization module will wait for a notification from any JVM that a garbage collect or code optimization has started or ended. A JVM might also notify the master synchronization module that the previously reported predicted garbage collection time has changed. In step 602, the master synchronization module requests predictions of the start and end times for garbage collects from all the JVMs running within the hypervisor. It updates the schedule accordingly. At step 604, the master synchronization module detects garbage collection overlaps and minimizes overlaps by advancing the start times of predicted garbage collects. There can still be overlaps if a JVM is forced to garbage collect earlier than predicted or if a garbage collect cannot be advanced. This can happen if the application behavior suddenly changes. At step 606, the master synchronization module detects overlaps between code optimizations and garbage collects, if it finds any, the code optimizations are postponed to avoid overlaps. There can still be overlaps if a JVM is forced to garbage collect earlier than predicted. At step 608, the master synchronization module schedules new code optimization using a round robin scheme. At step 610, the master synchronization module enters the wait state again.

Figure 7:
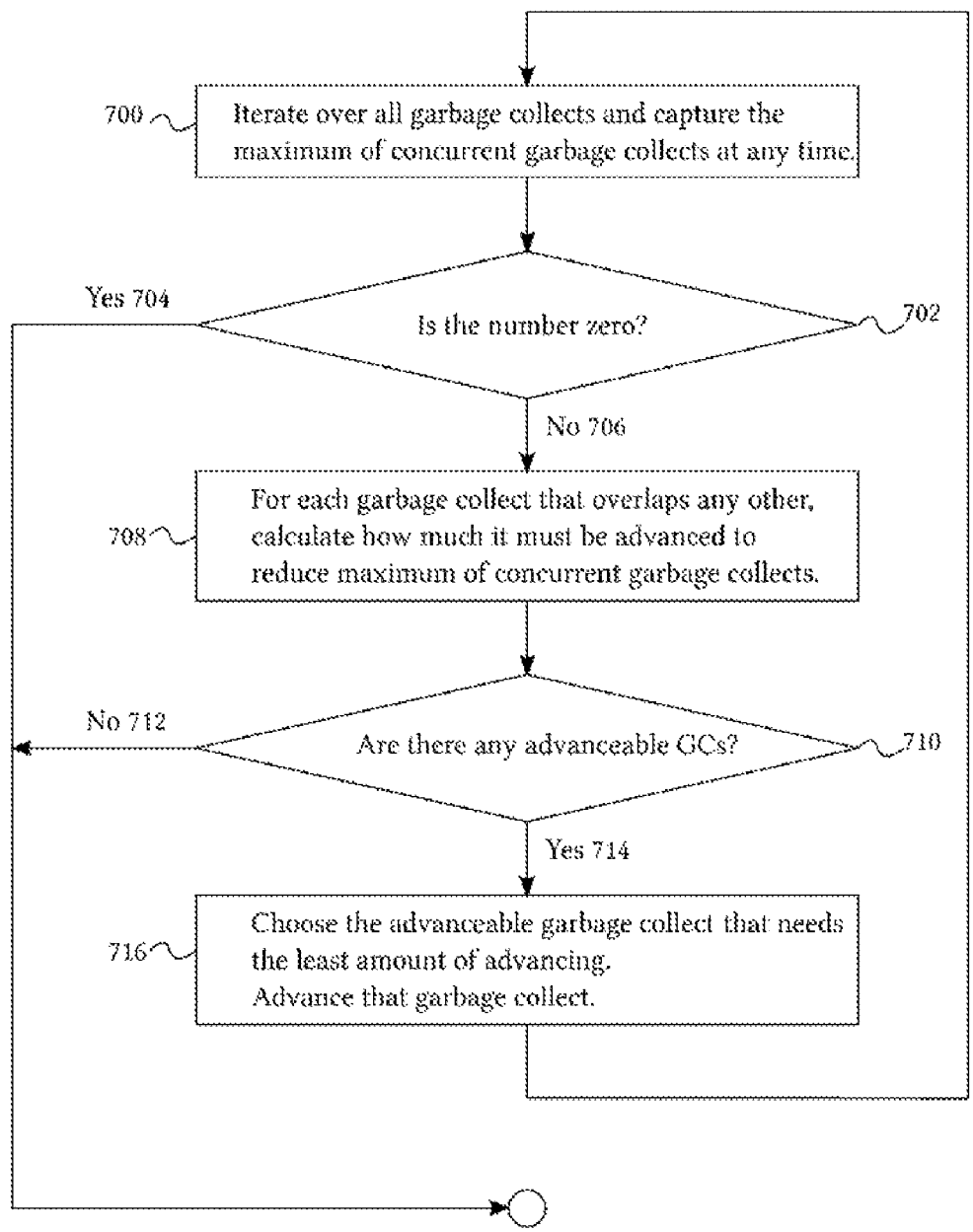
FIG. 7 shows a flowchart of a method to advance garbage collects to avoid overlaps, in accordance with an embodiment.

FIG. 7 shows a flowchart of a method to advance garbage collects to avoid overlaps, in accordance with an embodiment. As shown in FIG. 7, in step 700 the master synchronization module iterates over each start and end point in time of each garbage collect. At each point in time, it counts how many other garbage collects are active at that particular point in time. It stores the maximum number of concurrently active garbage collections. In step 702, it is checked if the stored number is zero, since if zero then there are no overlapping garbage collections and the method will finish 704. If there are overlapping garbage collects 706, then in step 708 the method calculates, for each garbage collect, that overlaps any other, how much the garbage collect must be advanced until the maximum number of concurrently overlapping garbage collects is reduced. A garbage collect that, no matter how much it is advanced cannot reduce the maximum number of concurrent garbage collects is non-advanceable. If all garbage collects are non-advanceable 712, then the method is finished. If there are advanceable garbage collects 714 then the system picks the one that requires the least amount of advancing 716 and advances this garbage collect. The method then restarts at step 700.

The method shown in FIG. 7 must eventually terminate, since at each iteration it will reduce the maximum number of concurrent garbage collects (step 716). If it cannot reduce the number of concurrent garbage collects it will terminate, either at step 702 when there are no overlapping garbage collects, or at step 710 when no improvement can be made.

Figure 8:
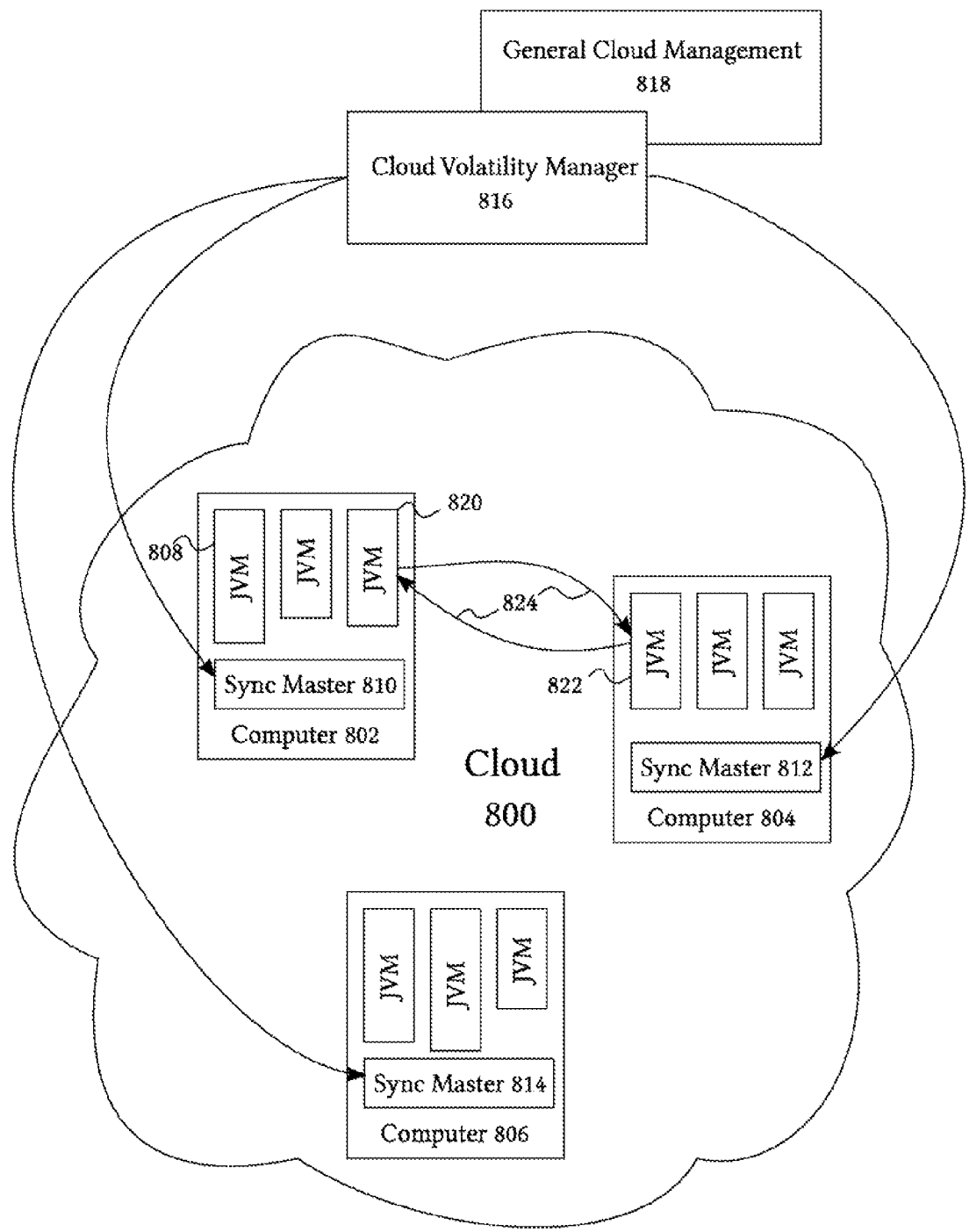
FIG. 8 shows an illustration of how a cloud of computers can be controlled by a cloud manager to reduce computer volatility, in accordance with an embodiment.

FIG. 8 shows an illustration of how a cloud of computers can be controlled by a cloud manager to reduce computer volatility, in accordance with an embodiment. As shown in FIG. 8, a cloud of computers 800 comprises individual computers 802, 804, 806, each executing a plurality of virtual servers executing one or more JVMs 808. The JVMs within each single computer is associated with a master synchronization module 810, 812, 814 at that computer. In accordance with an embodiment, the master synchronization modules are controlled by a cloud volatility manager 816, which can work together with other management tools 818 generally provided with such cloud environments. If a first computer 802 has a high overall volatility, i.e. there are many collisions between garbage collects and code optimizations between the virtual servers running on this computer, and a second computer 804 has a low overall volatility, then the cloud volatility manager 816 can decide to switch or change the computer hosts 824 for the virtual servers 820 and 822. If the overall volatility of the computer 802 did not decrease more than the overall volatility of 804 increased, then the switch would be reverted. In accordance with an embodiment the switch could be preceded by a check that the virtual server 820 has a more unpredictable behavior than the virtual server 822. This can for example be measured by the standard deviation of the distance between garbage collects.

Figure 9:
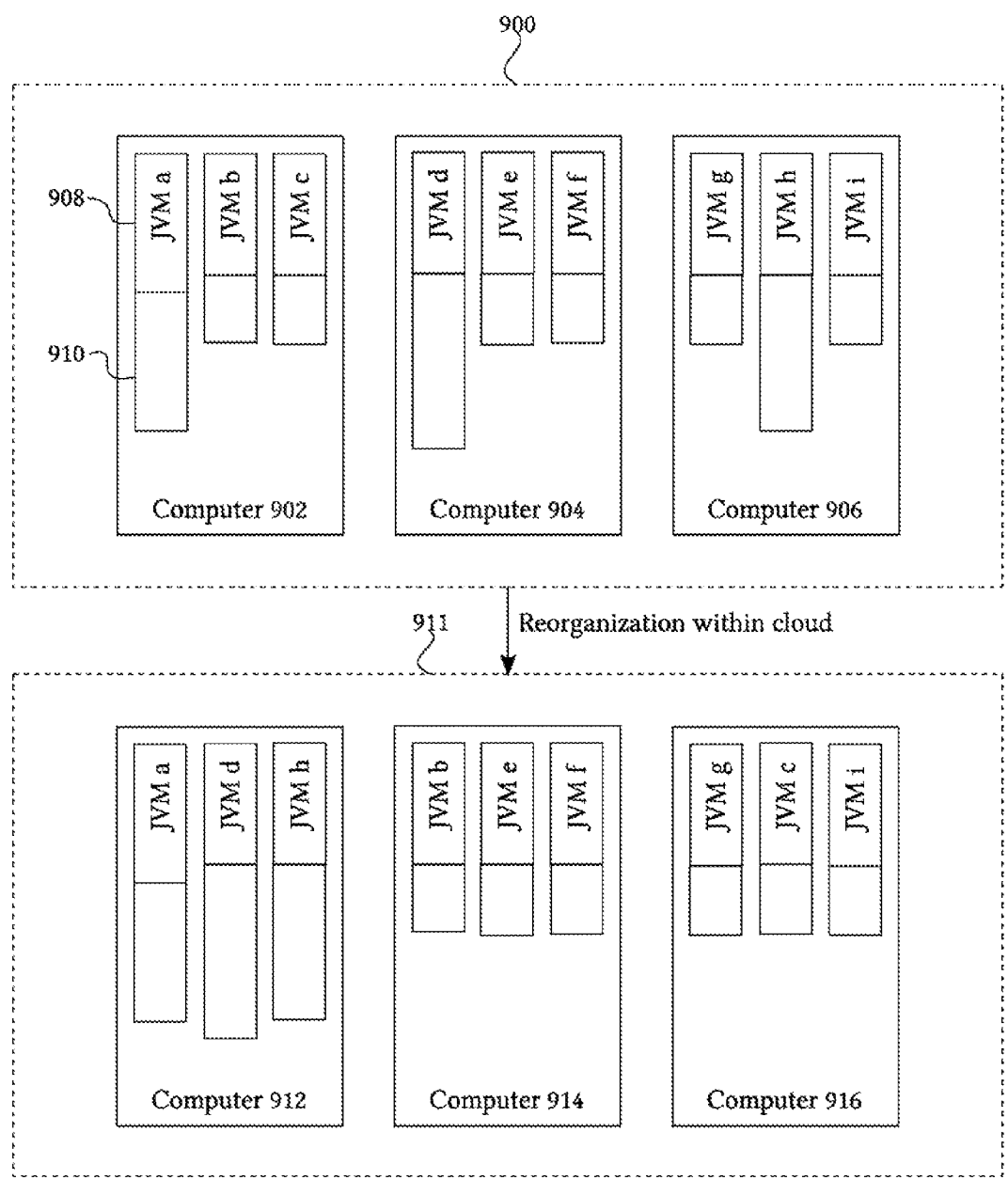
FIG. 9 shows an illustration of how a cloud of computers can be controlled by a cloud manager to reduce computer resource usage, in accordance with an embodiment.

FIG. 9 shows an illustration of how a cloud of computers can be controlled by a cloud manager to reduce computer resource usage, in accordance with an embodiment. As shown in FIG. 9, a cloud of computers 900 comprises individual computers 902, 904, 906, each executing a plurality of virtual servers executing one or more JVMs. Each JVM has a non-transient memory usage 908 and a transient memory usage 910. To achieve the largest memory and cpu usage savings, it is also important for the cloud volatility manager to locate virtual servers with the same transient memory and cpu usage on the same computer. Cloud 900 is therefore suboptimal since all the computers 902, 904 and 906 require the same large amount of transient memory. By relocating the virtual servers into a new cloud configuration 911 the maximum transient memory usage of the server 912 is almost equivalent to the original configuration 902. However the maximum transient memory usage is significantly reduced for 914 and 916 compared to their original configurations 904 and 906. In accordance with an embodiment such a relocation is based on the mean and standard deviation of the transient memory usage of the virtual servers. Since the transient memory usage is reduced, more virtual servers can be hosted on the computers 914 and 916.

The present invention may be conveniently implemented using one or more conventional general purpose or specialized digital computer, computing device, machine, or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for synchronizing transient resource usage between virtual servers in a hypervisor environment, comprising:
    a computer which includes
        a hypervisor running thereon, for executing virtual servers, and
        a communication channel, that enables synchronization between the virtual servers;
    a plurality of virtual servers executing on the hypervisor and including a plurality of synchronization modules, wherein each virtual server includes
        a non-transient memory space or heap, for storage and execution of relatively longer-lived processes,
        a transient memory space or heap, for storage and execution of relatively shorter-lived processes, and
        a synchronization module that uses the communication channel to communicate with synchronization modules at others of the virtual servers;
    wherein a master synchronization module is selected within the plurality of synchronization modules; and
    wherein the virtual servers can advance or postpone execution of those processes that make use of the transient memory space or heap, to synchronize transient resource usage between the plurality of virtual servers, including wherein the master synchronization module uses the communication channel to pass tokens to the virtual servers, wherein each token provides a receiving virtual server a right to perform a garbage collection or code optimization task within a certain period of time specified by the token, and wherein if the task is not completed by the receiving virtual server within that period of time, the receiving virtual server aborts the task.

2. The system of claim 1, wherein each virtual server runs one or more Java Virtual Machines (JVMs).

3. The system of claim 2, wherein one or more of the virtual servers has an operating system tailored to only run a single JVM, and to reduce volatility of the single JVM.

4. The system of claim 2, wherein the non-transient memory space or heap includes internal JVM memory and Java Heap memory.

5. The system of claim 1, wherein the transient memory space or heap is memory used for garbage collection processes.

6. The system of claim 1, wherein the transient memory space or heap is memory used for code optimization processes.

7. The system of claim 1, wherein each of the plurality of synchronization modules determines predictions of times of garbage collects, code optimizations, or other processes at that virtual server, and communicates the predictions to the master synchronization module.

8. The system of claim 7, wherein the transient memory space or heap is memory used for garbage collection processes, and wherein the master synchronization module advances garbage collects at particular ones of the virtual servers, based on the predictions received from synchronization modules at those particular virtual servers, to avoid overlaps with other garbage collects at others of the virtual servers.

9. The system of claim 7, wherein the transient memory space or heap is memory used for code optimization processes, and wherein the master synchronization module postpones code optimizations at particular ones of the virtual servers, based on the predictions received from synchronization modules at those particular virtual servers, to avoid overlaps with garbage collects and other code optimizations at others of the virtual servers.

10. The system of claim 7, wherein the number of actual overlaps is used to determine if a computer can host more virtual servers.

11. The system of claim 7, wherein the master synchronization module requests new predictions from the synchronization modules at the other virtual servers, and uses the predictions to update a schedule of garbage collects, code optimizations, or other processes, from an original schedule to a modified schedule.

12. The system of claim 7, wherein the synchronization module uses the communication channel to communicate information between the plurality of virtual servers, and to synchronize transient resource usage between the virtual servers.

13. The system of claim 1, wherein the communication channel is provided as part of the hypervisor.

14. The system of claim 7, wherein each of the synchronization modules performs the steps of:
    waiting for a notification from a virtual server,
    requesting garbage collection predictions from all other virtual servers,
    detecting and minimizing the number of garbage collection overlaps by advancing garbage collects as necessary,
    detecting and minimizing the number of code optimization overlaps by postponing code optimizations as necessary, and
    scheduling garbage collects, code optimizations, or other processes to synchronize transient resource usage between the plurality of virtual servers.

15. The system of claim 1, wherein the system is used as a component for controlling the volatility of a cloud of virtual servers, and wherein the system further comprises:
    a cloud volatility manager that monitors the volatility of computers within the cloud;
    a plurality of computers participating in the cloud, each of which one or more computers further includes virtual servers with measured resource usage volatility, and configured to synchronize transient resource usage between the plurality of virtual servers; and
    wherein the cloud volatility manager can switch or move virtual servers from a first of the plurality of computers participating in the cloud, to a second of the plurality of computers participating in the cloud, to improve volatility in the cloud.

16. The system of claim 1, wherein if the garbage collection or code optimization task is not completed by the receiving virtual server within the period of time such that the receiving virtual server aborts the task, the failure is reported to the synchronization module which subsequently sends a modified token to the virtual server specifying an increased period of time.

17. A method of synchronizing transient resource usage between virtual servers running in a hypervisor environment, comprising the steps of:
- providing a computer which includes
  - a hypervisor running thereon, for executing virtual servers, and
  - a communication channel, that enables synchronization between the virtual servers;
- providing a plurality of virtual servers executing on the hypervisor and including a plurality of synchronization modules, wherein each virtual server includes
  - a non-transient memory space or heap, for storage and execution of relatively longer-lived processes,
  - a transient memory space or heap, for storage and execution of relatively shorter-lived processes, and
  - a synchronization module that uses the communication channel to communicate with synchronization modules at others of the virtual servers;
- selecting a master synchronization within the plurality of synchronization modules; and
- using the communication channel to pass tokens from the master synchronization module to the virtual servers, wherein each token provides a receiving virtual server a right to perform a garbage collection or code optimization task within a certain period of time specified by the token, and wherein if the task is not completed by the receiving virtual server within that period of time, the receiving virtual server aborts the task, such that the virtual servers can advance or postpone execution of those processes that make use of the transient memory space or heap, to synchronize transient resource usage between the plurality of virtual servers.

18. The method of claim 17, wherein each of the plurality of virtual servers further comprises a synchronization module which determines predictions of times of garbage collects, code optimizations, or other processes at that virtual server, and wherein each of the synchronization modules performs the steps of:
- waiting for a notification from a virtual server,
- requesting garbage collection predictions from all other virtual servers,
- detecting and minimizing the number of garbage collection overlaps by advancing garbage collects as necessary,
- detecting and minimizing the number of code optimization overlaps by postponing code optimizations as necessary, and
- scheduling garbage collects, code optimizations, or other processes to synchronize transient resource usage between the plurality of virtual servers.

19. The method of claim 17, wherein the method is used as a component for controlling the volatility of a cloud of virtual servers, and wherein the method further comprises:
- providing a cloud volatility manager that monitors the volatility of computers within the cloud;
- providing a plurality of computers participating in the cloud, each of which one or more computers further includes virtual servers with measured resource usage volatility, and configured to synchronize transient resource usage between the plurality of virtual servers; and
- wherein the cloud volatility manager can switch or move virtual servers from a first of the plurality of computers participating in the cloud, to a second of the plurality of computers participating in the cloud, to improve volatility in the cloud.

20. A non-transitory computer-readable medium, including instructions stored thereon which, when read and executed by one or more computers, causes the one or more computers to perform the method comprising the steps of:
- providing a computer which includes
  - a hypervisor running thereon, for executing virtual servers, and
  - a communication channel, that enables synchronization between the virtual servers;
- providing a plurality of virtual servers executing on the hypervisor and including a plurality of synchronization modules, wherein each virtual server includes
  - a non-transient memory space or heap, for storage and execution of relatively longer-lived processes,
  - a transient memory space or heap, for storage and execution of relatively shorter-lived processes, and
  - a synchronization module that uses the communication channel to communicate with synchronization modules at others of the virtual servers;
- selecting a master synchronization within the plurality of synchronization modules; and
- using the communication channel to pass tokens from the master synchronization module to the virtual servers, wherein each token provides a receiving virtual server a right to perform a garbage collection or code optimization task within a certain period of time specified by the token, and wherein if the task is not completed by the receiving virtual server within that period of time, the receiving virtual server aborts the task, such that the virtual servers can advance or postpone execution of those processes that make use of the transient memory space or heap, to synchronize transient resource usage between the plurality of virtual servers.

* * * * *

UNITED STATES PATENT AND TRADEMARK OFFICE
CERTIFICATE OF CORRECTION

| | | |
|---|---|---|
| PATENT NO. | : 8,261,269 B2 | |
| APPLICATION NO. | : 12/563440 | |
| DATED | : September 4, 2012 | |
| INVENTOR(S) | : Garmark | |

It is certified that error appears in the above-identified patent and that said Letters Patent is hereby corrected as shown below:

In the drawings: On sheet 6 of 9, in figure 6, Box 610, line 1, delete "state," and insert -- state. --, therefor.

In column 4, line 42, delete "JVM1" and insert -- JVM 1 --, therefor.

Signed and Sealed this
Eighteenth Day of December, 2012

David J. Kappos
*Director of the United States Patent and Trademark Office*